March 31, 1964     H. M. WHITE     3,126,662
LEADER HOLDER
Filed April 14, 1960
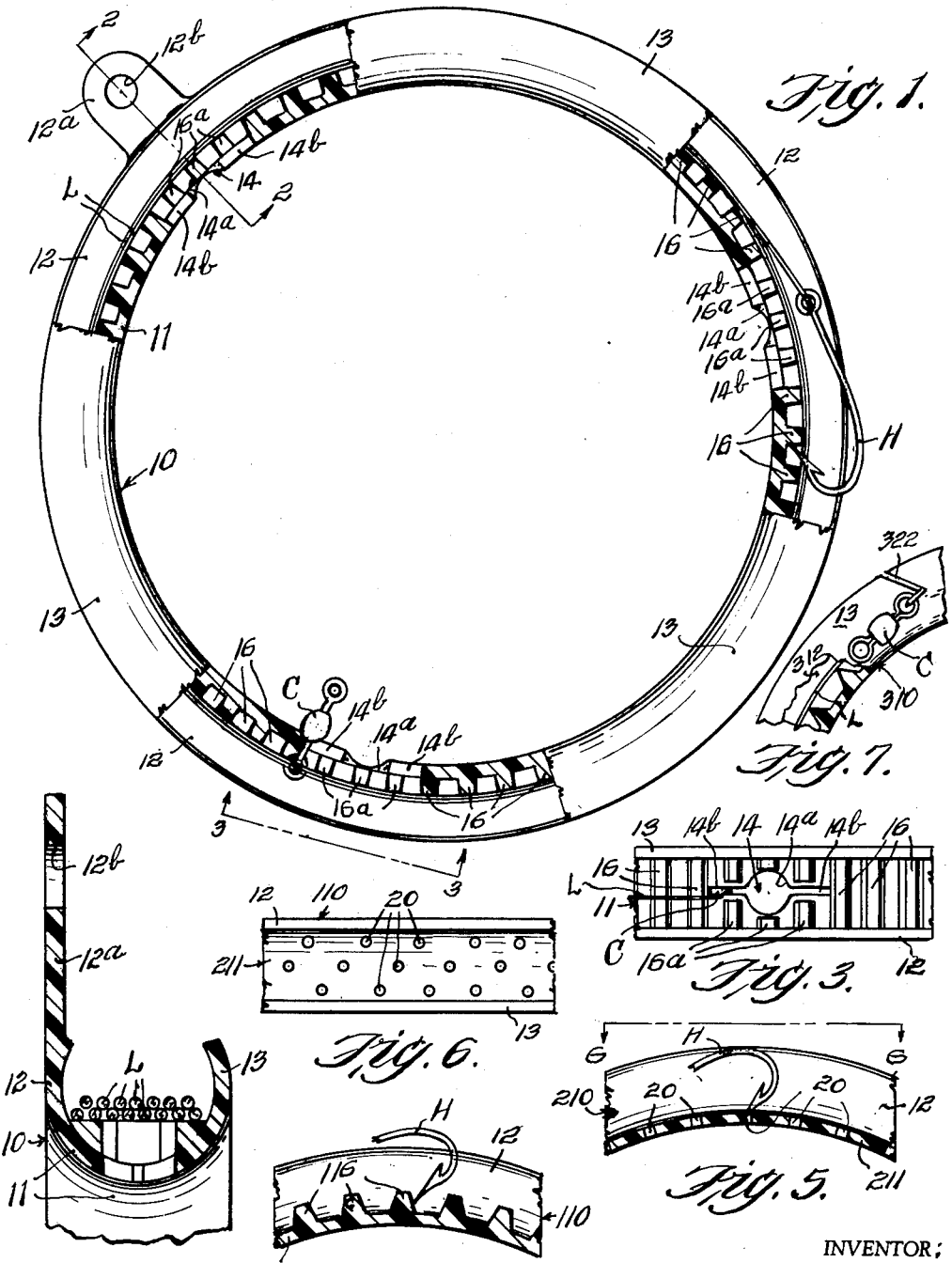
INVENTOR;
HARRY M. WHITE.
BY
ATTORNEY

United States Patent Office 3,126,662
Patented Mar. 31, 1964

3,126,662
LEADER HOLDER
Harry M. White, 240 Oriole Drive, Sarasota, Fla.
Filed Apr. 14, 1960, Ser. No. 22,240
2 Claims. (Cl. 43—57.5)

The present invention relates to a holder for fish line leaders and the like, of the type comprising a wire or other suitable filamentary element having a fish lure or a fish hook attached to one end and a swivel device or the like on the other end by which the leader can be readily connected and disconnected from a fish line.

The principal object of the present invention is the provision of a holder for fish line leaders and the like comprising a spool-like member forming a relatively narrow annular track or channel in which one or more leaders of the type mentioned may be easily wound and secured for storage or carrying, the spool-like member having means by which a swivel or other attaching device at one end of the leader can be secured so that the leader may be wound thereon and having a multiplicity of shoulder-like surfaces on the bottom wall of the channel projecting radially and extending parallel to the axis of the spool-like member so that these surfaces may be engaged by a fish hook to retain the leader wound on the holder.

In the preferred forms of the invention, the leader holder comprises an annular or ring-like member, channel-shaped in cross section, having an open side facing outwardly to provide a narrow spool-like form, one wall of the channel having one or more openings and slots therein so that the leader adjacent the attaching device may be inserted into the slot with the attaching device thereon passed through a larger portion of an opening after which the leader adjacent the attaching device is drawn into the slot-like portion of the opening which cannot pass the attaching device thereby securing one end of the leader to the holder to enable the remainder of the leader to be wound on the holder within the channel, and the bottom wall of the channel has a multiplicity of closely spaced shoulders extending transversely thereof, whereby a fish hook on the other end of the leader can be engaged with one of these shoulder surfaces after the leader is wound on the holder so that the tension on the leader retains the hook engaged to the shoulder to maintian the leader snugly in place. Preferably, the shoulder surfaces for retaining the hook end of the leader are formed by lugs or ridges extending transversely from one side of the channel flange to the other.

Other objects and advantages of the invention will be apparent from the following descriptions of preferred embodiments of the invention, reference being made to the accompanying drawings, wherein FIG. 1 is a side elevational view of a preferred form of a fish line leader holder, parts thereof being shown broken away;

FIG. 2 is a sectional view taken on line 2—2 of FIG. 1, but on a larger scale;

FIG. 3 is a fragmentary elevational view taken along line 3—3 of FIG. 1;

FIG. 4 is a fragmentary view in section of another form of fish line leader holder;

FIG. 5 is a view similar to FIG. 4 of still another form of the invention;

FIG. 6 is a view taken along line 6—6 of FIG. 5; and

FIG. 7 is a fragmentary view in elevation of a leader holder embodying still another form of the invention, a portion of the holder being broken away.

Referring to FIGS. 1 through 3, a fish line leader holder is shown comprising an annular member 10, preferably formed of a suitable molded plastic material such as polyethelene, although it may be formed of any other suitable material. The transverse cross-sectional form of member 10, as clearly seen in FIG. 2, is channel-shaped, having a bottom wall 11 and side walls or flanges 12 and 13. The open side of the channel faces outwardly so that a relatively narrow track or spool is formed on which one or more fish leaders L may be wound between the side flanges. Bottom or yoke wall 11 has three openings 14 formed therethrough at spaced intervals, and each of these openings has a relatively large circular central portion 14a and two oppositely extending slots 14b. Openings 14a are of such size to freely accept therethrough a swivel type connecting device C commonly attached to one end of the filamentary portion of a leader by which the leader is conveniently attached or detached from fish lines, the slots 14b being narrower than the connecting device and adapted to receive only the leader proper so that by inserting the connecting device through opening 14a and then drawing the portion of the leader adjacent thereto to the connecting device into one slot 14b or the other, depending on the direction the leader is to be wound on the holder, the device engages the edges of the slot to secure or anchor the leader end to wall 11 so that the leader may then be easily wound about member 10 between the flanges 12 and 13 thereof. This securing of the leader is illustrated in FIG. 1, wherein leader L is shown having a connecting device C attached to one end which is inserted in a slot 14b.

Bottom wall 11 has a multiplicity of relatively closely spaced shoulders which are in the form of ridges 16 which extend between flanges 12 and 13, except for ridges 16a which are interrupted centrally by openings 14, and the ridges lie generally in planes extending parallel to and radially of the axis of the holder.

Ridges 16 and 16a provide shoulder surfaces against which the barbed end of a fish hook H, attached to the other end of leader L, can be engaged, as seen in FIG. 1. The ridges 16 are spaced from one another so that regardless of the length of a particular leader, the resiliency of the leader wound on the holder permits the hook to engage one of the shoulders and to be maintained under tension thereagainst. The ridges 16, extending the width of the channel, permit the leader convolutions on the holder to be separated for exposing the appropriate ridge or shoulder with which the hook may be engaged.

Preferably, flange 12 has a tab 12a formed thereon which is perforated at 12b to provide means for hanging the holder on a peg or hook-like support.

In the form of the invention shown in FIG. 1, ridges 16 are formed rectangular in transverse cross-section with slightly tapered sides to permit withdrawal from a mold; however, different forms of shoulders may be employed. For example, referring to FIG. 4, a portion of a leader holder 110 is shown which is similar to holder 10 except that it has transverse ridges 116, which are like ridges 16 except that their cross-sectional form is that of a truncated triangle, and their function is similar to that of ridges 16.

A third holder 210 is shown in FIGS. 5 and 6, and is similar to 10 in all respects except that the shoulders for receiving the fish hooks are formed by providing a multiplicity of relatively small openings 20 are formed through wall 211 of the holder and are closely spaced and staggered relative one another. The walls of these openings 20 form shoulders against which the point of the hook may be engaged by inserting the point into a convenient opening, after the leader has been wound on the member, to maintain tension on the wound leader, as described relative to the leader on holder 10.

Another form of the invention is shown in FIG. 7 in which a holder 310 is formed similarly to holder 10 with the exception that the ridges are saw-tooth shape, i.e., pointed, in cross-section, and one or more slots 322 are formed in the edge of a flange 312, which is similar to flange 12, the slot extending angularly with respect to the radius of the holder, and the slot is arranged to receive the end portion of the leader to be wound on the holder with the swivel C on the outside of the flange to anchor the leader and permit it to be snuggly wound on the holder.

It will be seen that by my invention a convenient, inexpensive holder is provided for storing and carrying fish line leaders of varying lengths so that the leaders may be prevented from becoming tangled or snarled, and while several forms of the invention have been shown, it is to be understood that other forms, modifications and adaptations could be made, all falling within the scope of the following claims.

I claim:

1. A fish line leader holder including an annular member comprising means forming two oppositely disposed spaced annular side walls lying in planes extending generally radially thereof and interconnected by a yoke wall disposed inwardly from the outer edges of said side walls to provide a circular channel open about its outer side, said yoke wall comprising a multiplicity of uniform ridges interconnecting said side walls and spaced relatively close to one another about said annular member to receive a fish leader received between said side walls and wound about said yoke wall and to provide closely spaced shoulders against which the point of a hook or the like on a leader may rest, and said yoke wall having an opening therethrough which opening includes a slot formation the opposite edges of which slot formation are spaced for closely receiving an end portion of the leader to attach one end of a leader to said annular member.

2. A fish line leader holder comprising an annular member channel shaped in cross-section having opposite sides and a yoke wall therebetween to provide a spool-like form on which a fish line leader may be wound, the yoke wall of said channel having at least one opening for receiving an attaching device at one end of the leader defined by opposite edges spaced from said sides of said channel-shaped member, a multiplicity of closely spaced ridges formed on the yoke wall of said channel shaped member and extending transversely of said channel and disposed about the circumference of said member, and ridges formed on said yoke wall extending from said opposite edges of said opening to the respective adjacent sides of said channel shaped member.

References Cited in the file of this patent

UNITED STATES PATENTS

| | | |
|---|---|---|
| 487,704 | Back | Dec. 13, 1892 |
| 1,256,278 | Takeuchi | Feb. 12, 1918 |
| 1,890,945 | Hormel | Dec. 13, 1932 |
| 2,029,975 | Winchester | Feb. 4, 1936 |
| 2,328,335 | Fryer et al. | Aug. 31, 1943 |
| 2,394,639 | Seem | Feb. 12, 1946 |
| 2,595,463 | Kamps | May 6, 1952 |
| 2,936,963 | Witte | May 17, 1960 |

FOREIGN PATENTS

| | | |
|---|---|---|
| 698,318 | Great Britain | Oct. 14, 1953 |